(12) United States Patent
Pandya et al.

(10) Patent No.: US 10,326,731 B2
(45) Date of Patent: *Jun. 18, 2019

(54) DOMAIN NAME SERVICE INFORMATION PROPAGATION

(71) Applicant: Amazon Technologies, Inc., Seattle, WA (US)

(72) Inventors: Chirag Pravin Pandya, Sammamish, WA (US); Connor John Yorks, Seattle, WA (US); Krithi Rai, Redmond, WA (US); Lawrence Hun-Gi Aung, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/693,089

(22) Filed: Aug. 31, 2017

(65) Prior Publication Data
US 2017/0366501 A1 Dec. 21, 2017

Related U.S. Application Data

(63) Continuation of application No. 14/305,848, filed on Jun. 16, 2014, now Pat. No. 9,756,012.

(51) Int. Cl.
*G06F 15/177* (2006.01)
*H04L 29/12* (2006.01)

(52) U.S. Cl.
CPC ...... *H04L 61/3025* (2013.01); *H04L 61/1511* (2013.01)

(58) Field of Classification Search
USPC ........................................................ 709/220
See application file for complete search history.

(56) References Cited

U.S. PATENT DOCUMENTS

| | | | | |
|---|---|---|---|---|
| 6,119,171 | A * | 9/2000 | Alkhatib | H04L 29/06 370/390 |
| 7,039,697 | B2 * | 5/2006 | Bayles | G06Q 40/04 709/223 |
| 7,130,878 | B2 * | 10/2006 | Parsons | H04L 29/12594 709/202 |
| 7,133,404 | B1 * | 11/2006 | Alkhatib | H04L 29/12009 370/392 |
| 7,299,299 | B2 * | 11/2007 | Hollenbeck | G06Q 10/02 709/245 |

(Continued)

*Primary Examiner* — Alicia Baturay
(74) *Attorney, Agent, or Firm* — Davis Wright Tremaine LLP

(57) ABSTRACT

A computing resource service receives a request from a customer to assign a domain name to a computing resource. The computing resource service may submit a query to a domain name system service to determine whether the domain name has been reserved for the customer. The domain name system service may provide an encrypted alias record corresponding to the requested domain name and specifying one or more identifiers of customers for whom the domain name has been reserved. The computing resource service may decrypt the alias record and determine whether the customer corresponds to one of the one or more identifiers within the alias record. If the customer does correspond to one of the one or more identifiers within the alias record, the computing resource service may assign the domain name to the computing resource.

21 Claims, 10 Drawing Sheets

(56) References Cited

U.S. PATENT DOCUMENTS

| | | | | |
|---|---|---|---|---|
| 7,539,774 B2* | 5/2009 | Stahura | G06Q 30/06 | 709/222 |
| 7,624,152 B2* | 11/2009 | Zellner | G06Q 10/107 | 709/206 |
| 7,711,851 B2* | 5/2010 | Ronen | G06Q 30/04 | 705/37 |
| 7,734,745 B2* | 6/2010 | Gloe | H04L 29/12066 | 709/223 |
| 7,743,093 B2* | 6/2010 | Damour | G06Q 30/02 | 709/200 |
| 7,904,898 B2* | 3/2011 | King | H04L 29/12009 | 717/121 |
| 7,921,035 B2* | 4/2011 | Adelman | G06Q 30/0241 | 705/14.4 |
| 7,979,581 B2* | 7/2011 | Aso | H04L 29/12066 | 709/245 |
| 8,055,795 B2* | 11/2011 | Taylor | H04L 29/12066 | 709/227 |
| 8,171,467 B1 | 5/2012 | Li et al. | | |
| 8,195,767 B2 | 6/2012 | Albrecht et al. | | |
| 8,234,379 B2* | 7/2012 | Young | G06Q 30/08 | 705/26.3 |
| 8,473,635 B1 | 6/2013 | Lohner et al. | | |
| 8,560,659 B2* | 10/2013 | Christenson | G06F 16/162 | 709/223 |
| 8,612,565 B2* | 12/2013 | Schneider | G06Q 30/02 | 709/203 |
| 8,819,073 B2* | 8/2014 | Ahlin | H04L 29/12188 | 707/797 |
| 9,374,244 B1* | 6/2016 | Brandwine | H04L 63/0823 | |
| 9,602,614 B1* | 3/2017 | Shankaran | G06F 15/177 | |
| 9,756,012 B1* | 9/2017 | Pandya | H04L 61/1511 | |
| 2003/0135509 A1* | 7/2003 | Davis | H04L 63/0227 | |
| 2003/0225670 A1* | 12/2003 | DeCarlo, III | G06Q 30/08 | 705/37 |
| 2004/0167982 A1* | 8/2004 | Cohen | H04L 29/12066 | 709/226 |
| 2005/0273344 A1* | 12/2005 | Lee | G06Q 20/10 | 705/39 |
| 2006/0218289 A1* | 9/2006 | Assad | H04L 29/12122 | 709/229 |
| 2006/0251239 A1* | 11/2006 | Taylor | H04L 29/12047 | 379/355.04 |
| 2008/0010365 A1* | 1/2008 | Schneider | G06Q 10/109 | 709/223 |
| 2008/0021890 A1* | 1/2008 | Adelman | G06F 16/9535 | |
| 2008/0028100 A1* | 1/2008 | Adelman | G06Q 10/107 | 709/245 |
| 2008/0028443 A1* | 1/2008 | Adelman | G06Q 10/107 | 726/4 |
| 2008/0043965 A1* | 2/2008 | Cellini | G06Q 10/10 | 379/205.01 |
| 2010/0005146 A1* | 1/2010 | Drako | G06Q 10/00 | 709/206 |
| 2010/0005191 A1* | 1/2010 | Drako | H04L 61/1511 | 709/238 |
| 2010/0011420 A1* | 1/2010 | Drako | G06Q 10/107 | 726/5 |
| 2011/0225263 A1* | 9/2011 | Sureshchandra | H04L 67/16 | 709/217 |
| 2014/0282887 A1* | 9/2014 | Kaminsky | H04L 61/1511 | 726/4 |

* cited by examiner

DOMAIN NAME SERVICE INFORMATION PROPAGATION

CROSS-REFERENCE TO RELATED APPLICATIONS

This application is a continuation of U.S. patent application Ser. No. 14/305,848, filed Jun. 16, 2014, entitled "DOMAIN NAME SERVICE INFORMATION PROPAGATION," now U.S. Pat. No. 9,756,012, the disclosures of which are incorporated herein by reference in their entirety.

BACKGROUND

A computing resource service provider may provide various services to customers. For example, a customer with an account of the service provider may programmatically manage computing resources hosted by the service provider. Similarly, access to the resources may occur over a network. To simplify management of and access to computing resources hosted by a service provider, customers may utilize a domain name service. In this manner, various computing devices can be programmed with domain names corresponding to resources instead of hard coding Internet Protocol (IP addresses) and other identifiers, which may change over time as a result of actions performed by the customers and/or as a result of actions performed by the service provider. As an example, customers may utilize managed directory services to create and maintain a directory (e.g., file systems, files, users, security policies, network resources, applications, system storage, etc.) for data management and, generally, access to a variety of resources. In order to make this directory easier for others to access, customers may request that a particular domain name be assigned to the directory.

The use of domain names, however, can present various issues. For example, numerous entities may desire use of the same domain name. Sometimes, entities simply desire the same domain name because, for instance, the domain name has semantic meaning of some value to each entity. Often, multiple entities will have a legitimate claim to the same domain name. In other examples, some entities reserve domain names for the purpose of selling the domain names to others. In this latter example, such reservation schemes may violate terms of use, rules and/or laws but may nevertheless cause significant burdens on organizations that utilize domain names. Generally, effective management of domain names creates numerous burdens on those who manage and utilize such domain names as part of their operations.

BRIEF DESCRIPTION OF THE DRAWINGS

Various embodiments in accordance with the present disclosure will be described with reference to the drawings, in which.

DETAILED DESCRIPTION

Figure 1:
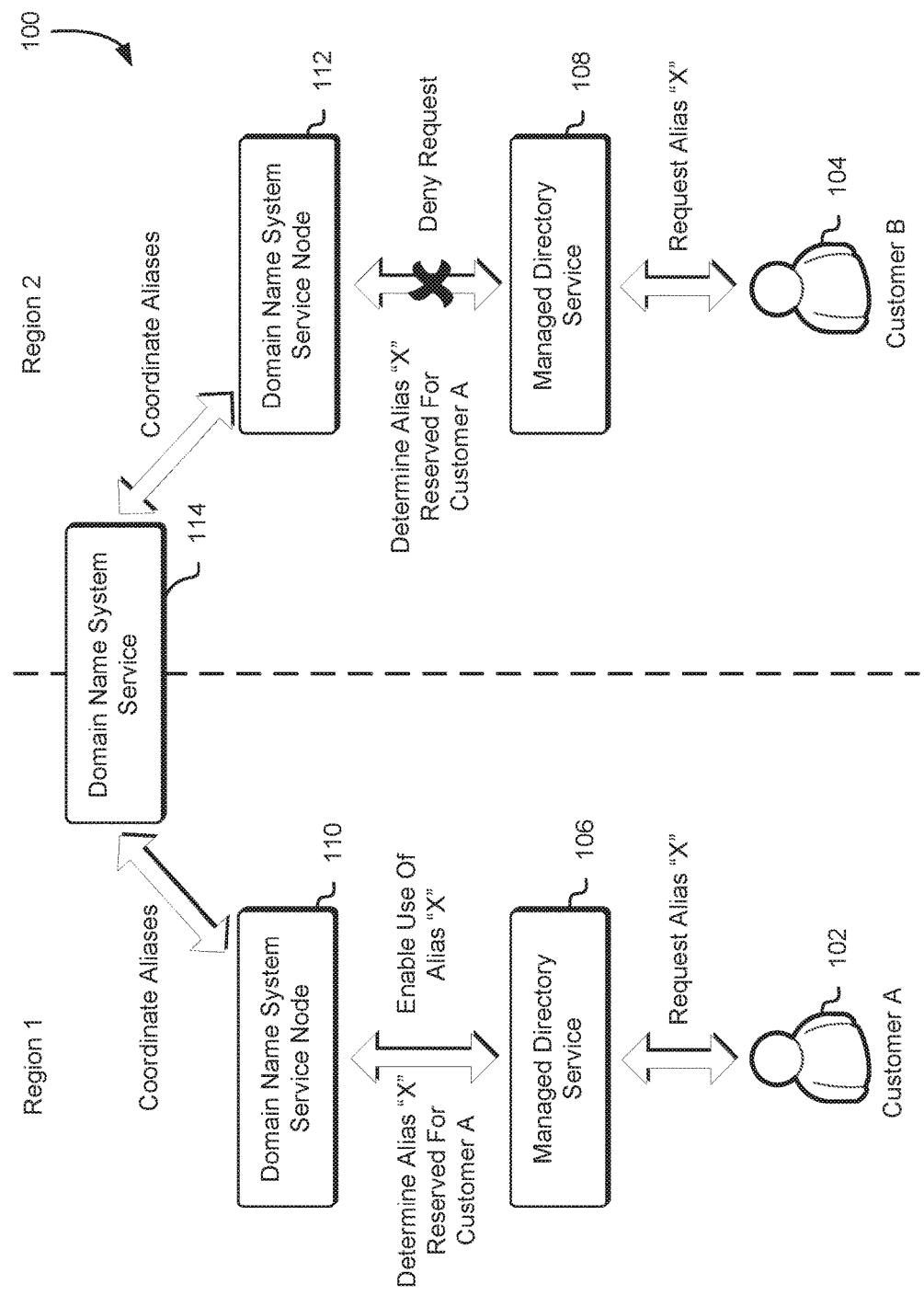
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the use of the Domain Name System (DNS) to securely transmit data across multiple regions. In an embodiment, an entity (e.g., an organization) communicates, through associated computing devices, with a managed directory service. The communications may be made in accordance with one or more protocols utilized by the managed directory service, such as through an application programming interface (API) call to the service. In some examples, a communication to the managed directory service is to request assignment of a particular alias (e.g., machine name label for a uniform resource locator that includes a domain name) to a managed directory provisioned and managed by the entity. The entity may be a customer of a computing resource service provider that operates various services such as a virtual computer system service, object-based data storage services, database services, the aforementioned managed directory service and other services.

In various embodiments, the managed directory service will determine, based on the request, the identity of the entity requesting the particular alias. The managed directory service may communicate with a DNS service to determine whether the particular alias has been assigned to another entity. If the alias has not been assigned to another entity, the managed directory service may submit a query to the DNS service to determine whether there is an entry within a DNS database corresponding to the alias and a control character. If there is such an entry, the managed directory service may obtain an encrypted alias record corresponding to the entry. The encrypted alias record may specify a customer identifier corresponding to a customer for whom the particular alias has been reserved. For instance, the computing resource service provider may reserve certain aliases for customers that utilize or provision a certain amount of computing resources, identifying these customers as high volume users. The managed directory service may utilize a cryptographic key and a salt or initialization vector to decrypt the alias record and identify whether the particular alias has been reserved for the entity that submitted the request. The managed directory service may deny the entity's request if it determines that the alias has been reserved for another customer. Otherwise, the management directory service may assign the alias to the entity's managed directory and notify the DNS service of the assignment.

In an embodiment, the DNS service receives a notification from the managed directory service, such as through an API call to the service, indicating that an alias has been assigned to a particular managed directory provisioned by the entity. Upon receiving the notification from the managed directory service, the DNS service may update the DNS entry for the entity's managed directory. For instance, if the alias "X" has been assigned to a managed directory as a result of a request, the DNS service may update the DNS entry for the managed directory such that the managed directory may be accessed by other users by utilizing a uniform resource locator (URL) within a browser application that references the domain name, such as "X.example.com", rather than an IP address, which may change over time more frequently than the domain name. Once the DNS entry for the managed directory has been updated, the DNS service may update the DNS database to indicate that the alias has been assigned and is in use. For instance, using the example above, the DNS database may include an entry for the alias such as "X/000.example.com", where "X" is the alias and "/000" is the control character. Once the alias has been assigned, the DNS service may update the DNS database to introduce the newly assigned domain name, resulting in an entry of "X.example.com" and the previous alias entry, "X/000.example.com," within the DNS database. Thus, if another entity attempts to obtain this alias for its own managed directory, the managed directory service may discover that the alias has been assigned and deny the request. The DNS database and the alias records included within may be made available by the DNS service such that other computing resources and services in other regions may be able to query the DNS database and identify any available aliases.

In an embodiment, the DNS service is configured to modify the DNS database in the event that it detects that an alias has been released by the entity or the managed directory service itself. For instance, if the entity terminates his/her account with the computing resource service provider, the managed directory service may communicate with the DNS service to notify the DNS service that the entity has released the alias. In response, the DNS service may modify the DNS database to indicate that the alias is no longer assigned to an entity such that use of the alias will no longer enable a user to access the managed directory. In an embodiment, if the alias that has just been released was previously reserved for the particular entity, the DNS service may continue to maintain an entry within the DNS database (e.g., "X/000.example.com") to indicate that the alias remains reserved for the entity, should the entity wish to claim the alias for his/her managed directory in the future. Otherwise, the DNS service may update the DNS database to indicate that the alias is now available to any entity that would like to utilize the alias for his/her managed directory.

In an embodiment, the managed directory service is configured to identify any aliases that are to be reserved for various entities that satisfy certain criteria. For instance, the managed directory service may be configured to access an entity account to analyze the entity's computing resource usage, as well as the provisioning of computing resources by the entity to determine whether the entity may be deemed to be a high volume customer. If the managed directory service determines that the entity is a high volume customer, the managed directory service may communicate with the DNS service and cause the DNS service to reserve the alias for the entity by including a placeholder entry within the database and, for this entry, include an encrypted alias record that specifies the identity of the entity for whom the alias is reserved. Thus, if the entity creates a managed directory and requests that a particular alias be assigned to the managed directory, the managed directory service may be able to assign the alias to the managed directory and cause the DNS service to update the DNS entry for the managed directory and update the DNS database to indicate that the alias has been assigned.

In this manner, a managed directory service or any other service provided by the computing resource service provider may be able to assign and reserve aliases for various entities securely across multiple data regions using a DNS service. In addition, the techniques described and suggested herein facilitate additional technical advantages. For example, because the managed directory service may communicate with the DNS service to reserve an alias for a high volume customer, the managed directory service may be able to satisfy a request by this high volume customer to obtain an alias for his/her managed directory that is recognizable to users of the customer's managed directory. This has the added effect of preventing other entities from obtaining the alias for nefarious purposes, such as trying to extort payment from the high volume customer to obtain the alias.

FIG. 1 shows an illustrative example of an environment 100 in which various embodiments can be implemented. In the environment 100, a computing resource service provider provides various computing resource services to customers of the computing resource service provider. The computing resource service provider may be an organization that hosts various computing resources on behalf of one or more customers. For example, a computing resource service provider may operate one or more facilities that are used to host various computing hardware resources, such as hardware servers, data storage devices, network devices, and other equipment, such as server racks, networking cables and the like. The computing resource service provider may utilize its computing hardware resources to operate one or more services. Such services may include services that enable customers of the computing resource service provider to remotely manage computing resources to support the customers' operations while reducing or even eliminating the need of the customers to invest in physical equipment. Example services include, but are not limited to, various data storage services (object-based data storage services, archival data storage services, database services and the like), program execution services and other services. The services may be used by customers to support a wide variety of activities, such as operating a website, operating enterprise systems supporting an organization, distributed computation and/or other activities.

These services may be hosted in multiple locations worldwide in order to support a variety of customers that may want to operate these services from varied locations. Each location may comprise a number of data regions. Each data region may comprise one or more partitions of one or more data zones which may be used to further allocate computing resources to the customers utilizing one or more services provided by the computing resource service provider. For instance, a customer or other entity may be able to access these data regions through the one or more services provided by the computing resource service provider. For example, a customer may use a customer interface to access a virtual machine instance hosted in a particular data region. Alternatively, a computing resource or customer application may be configured to communicate with the customer interface in order to access these data regions on the customer's behalf.

Accordingly, as illustrated in FIG. 1, the environment 100 includes customers 102, 104 that may interact with one or more services provided by the computing resource service provider in different data regions. The customers 102, 104 may be individuals, organizations or automated processes that could utilize one or more services provided by the computing resource service provider to operate and manage a directory to support their operations. In order to operate and manage the directory, for instance, the customers 102, 104 may be required to access a managed directory service 106, 108 within their particular data region. For instance, the managed directory service 106, 108 may enable the customers 102, 104 to create and provide credentials for additional users of their directories, as well as deploy various applications and apply one or more security policies for the directories.

In order to enable other users to utilize a user-friendly domain name to access a directory through one or more communications networks, such as the Internet, a customer 102, 104 may submit a request to his/her respective managed directory service 106, 108 to request a particular alias for their directories. For instance, as illustrated in FIG. 1, Customer A 102 and Customer B 104 have both requested that the alias "X" be associated with their respective directories. In order to determine whether the alias "X" is available for each customer 102, 104, the managed directory service 106, 108 within each respective data region may submit a query to a DNS service node 110, 112 to determine whether the requested alias is available for assignment. For instance, in response to the query, the DNS service node 110, 112 may search a cached DNS database specifying the one or more DNS entries for computing resources to determine whether the requested alias is currently in use by another customer. For example, the query may specify whether the domain name "X.example.com" is being utilized by another customer. The DNS service node 110, 112 may utilize this character string to determine whether the entry, "X.example.com," is included within the DNS database. If an entry is found, then the DNS service node 110, 112 may determine that the alias is currently being utilized by another customer. If the DNS service node 110, 112 determines that the alias is being utilized by another customer, the managed directory service 106, 108 may deny the request.

In an embodiment, the DNS service nodes 110, 112 may communicate with a global DNS service 114 to obtain one or more updates for the DNS database stored within the nodes 110, 112. For instance, the DNS service nodes 110, 112 may obtain and cache information from the DNS database provided by the DNS service 114 in response to a triggering event (e.g., a certain number of DNS entries are added and/or modified within the authoritative DNS database within the DNS service 114, etc.) or at certain time intervals (e.g., every minute, every hour, etc.). Additionally, or alternatively, the DNS service nodes 110, 112 may obtain one or more updates from the DNS service 114, which may cause the DNS service nodes 110, 112 to update the cached DNS database. In response to the query from the managed directory service 106, 108, if the DNS service node 110, 112 is unable to locate a DNS entry corresponding to the requested alias within the cached DNS database, the DNS service node 110, 112 may communicate with the DNS service 114 to determine whether the alias is available for assignment.

If the DNS service node 110, 112 and DNS service 114 is unable to identify an entry within the DNS database that includes the alias as part of the domain name, the managed directory service 106, 108 may query the DNS service node 110, 112 to determine whether an alias has been reserved for another customer. For instance, in an embodiment, the DNS database may include one or more placeholders for aliases that may be reserved for particular customers. These one or more placeholders may be one or more domain names that include one or more control characters and one or more reserved aliases. For example, as illustrated in FIG. 1, the alias "X" has been reserved for Customer A 102. This alias reserved for Customer A 102 within the DNS database by generating a placeholder, such as "X/000.example.com," where "X" is the reserved alias and "/000" is the control character. Additionally, the DNS database may include, for this entry in the DNS database, an encrypted (e.g., Advanced Encryption Standard (AES)-256 symmetric key with a salt or initialization vector) alias record that specifies the identity of the customer for whom the alias is reserved. The alias record may be part of the TXT record (e.g., text record) of the domain name placeholder entry within the DNS database, although, in some embodiments, the alias record may be included within other records of the placeholder entry. Thus, utilizing the example above, the managed directory service 106, 108 may query the DNS service node 110, 112 to identify any entries within the DNS database that include the character string "X/000," which includes the requested alias and the one or more control characters, and to provide the encrypted alias record if such an entry is found within the DNS database. Additionally, if the DNS service node 110, 112 is unable to identify such an entry within the cached version of the DNS database, the DNS service node 110, 112 may communicate with the DNS service 114 to determine whether the entry is included within the authoritative version of the DNS database.

To identify which customers should have an alias reserved for his/her computing resources, the computing resource service provider, through the managed directory service 106, 108 or another service, may identify one or more high volume (e.g., exceed a certain threshold for computing resource usage and provisioning of computing resources) customers and reserve certain aliases for these high volume customers through the use of the one or more placeholders. While a managed directory service is used extensively throughout the present disclosure for the purpose of illustration, customers 102, 104 may utilize any other service usable for provisioning and managing computing resources to request a particular alias for his/her computing resources. For instance a customer 102, 104 may submit a request to an object-based data storage service to assign a particular alias to a particular logical data container.

The managed directory service 106, 108 within each particular data region may each include a cryptographic key and the salt or initialization vector, which may be used to decrypt the received alias record. For instance, the managed directory service 106, 108 may be provided with a salt or initialization vector and a symmetric key subject to the encryption standard utilized to encrypt the alias record (e.g., AES-256 symmetric key, etc.). This may enable the managed directory service 106, 108 to utilize the decrypted alias record to determine whether the requested alias has already been assigned to another customer. If the requested alias has been assigned to another customer, the managed directory service 106, 108 may deny the request. However, if the requested alias has been reserved for the customer that submitted the request for the alias, the managed directory service 106, 108 may assign the alias to his/her directory or other computing resource. For instance, in the environment 100, the managed directory service 106, 108 within both data regions has determined that the alias "X" has been reserved for Customer A 102. If any customer other than Customer A 102 submits a request to have the alias "X" assigned to his/her directory, the managed directory service 106, 108 may deny the request. Thus, the managed directory service 106 within the first data region may fulfill the request submitted by Customer A 102 by assigning the alias "X" to the directory operated and managed by Customer A 102. Meanwhile, the managed directory service 108 within the second data region may deny the request submitted by Customer B 104, since the alias "X" was reserved for Customer A 102.

While aliases and alias records are used throughout the present disclosure for the purpose of illustration, the DNS service node 110, 112 and DNS service 114 may include other data or information that may be encrypted and provided to the managed directory service 106, 108 or any other service provided by the computing resource service provider upon request. For instance, in an embodiment, the DNS service node 110, 112 and DNS service 114 includes, within the DNS database, one or more encrypted records specifying one or more policies for each customer 102, 104. For example, if a customer 102, 104 submits a request to a managed directory service 106, 108 to create a new managed directory, the managed directory service 106, 108 may obtain, from the DNS service node 110, 112 or the DNS service 114, an encrypted record specifying one or more policies specifying whether the managed directory service 106, 108 may fulfill the request. For instance, if a customer 102, 104 is only authorized to maintain three managed directories, as specified within a policy, the managed directory service 106, 108 may deny the request from the customer 102, 104 based at least in part on the received record.

In another embodiment, the DNS service node 110, 112 and DNS service 114 includes, within the DNS database, one or more encrypted records on behalf of the customer 102, 104. For instance, a customer 102, 104 may submit a request to maintain, as an encrypted record entry within the DNS database, a customer-specific cryptographic key which may be provided to the customer 102, 104. This customer-specific cryptographic key may be utilized by the customer 102, 104 to decrypt any sensitive customer data or information maintained by the customer within his/her computing resources. Further, the customer 102, 104 may authorize other entities to access this customer-specific cryptographic key to enable these entities to access customer information and data.

Once the managed directory service 106 has assigned the alias to the directory managed and operated by the customer 102, the managed directory service 106 may communicate with the DNS service node 110, such as through one or more API calls to the service, to notify the DNS service node 110 that the alias has been assigned to a directory managed and operated by the customer 102. The DNS service node 110, based at least in part on the notification received from the managed directory service 106, may update the DNS entry for the directory managed and operated by the customer 102 and update the alias record to include this new DNS entry for the managed directory. For instance, if the DNS database originally included the following placeholder for Customer A, "X/000.example.com," where "X" is the alias and "/000" is the control character, the DNS service node 110 may add an entry within the DNS database such that the DNS database includes entries for the placeholder "X/000.example.com" and the new domain name "X.example.com." The DNS service node 110 may transmit the updated DNS entry to the DNS service 114, to allow a managed directory service or any other service to identify the alias as having been assigned.

In an embodiment, the customer 102 may submit a request to the managed directory service 106 to release the alias from his/her directory. The managed directory service 106 may communicate with the DNS service node 110, such as through one or more API calls to the service, to cause the DNS service node 110 to update the DNS entry for the directory, such that the previously assigned domain name can no longer be utilized to access the customer's 102 directory. The DNS service node 110 may determine whether the alias was previously reserved for a customer 102. If the alias was previously reserved for a customer 102, then the DNS service node 110 may still maintain a placeholder within the DNS database to indicate that the alias is still reserved for the customer 102. Thus, if the customer 102 submits another request to assign the alias to his/her directory, the alias may still be available to him/her. Additionally, if another customer 104 attempts to have the alias assigned to his/her directory, the managed directory service 108 may deny the request.

Figure 2:
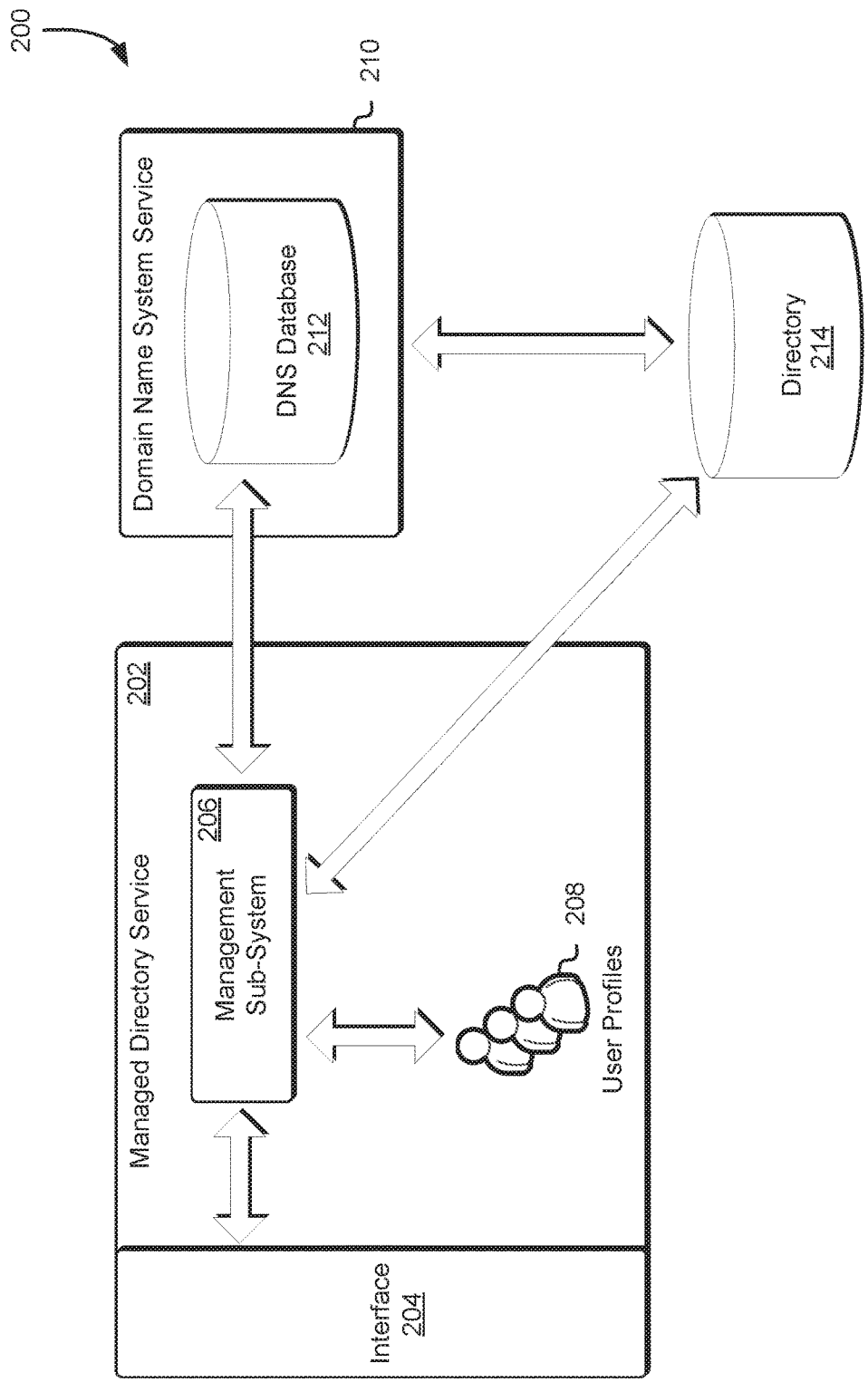
FIG. 2 shows an illustrative example of an environment in which a managed directory service coordinates with a domain name system service to determine if an alias is available for a particular customer directory in accordance with at least one embodiment.

As noted above, when a customer submits a request to a managed directory service to have a particular alias assigned to his/her directory such that the directory can be accessed by utilizing a user-friendly domain name, the managed directory service may coordinate with a DNS service to determine whether the alias is available for the customer. Accordingly, FIG. 2 shows an illustrative example of an environment 200 in which a managed directory service 202 coordinates with a DNS service 210 to determine if an alias is available for a particular customer directory 214 in accordance with at least one embodiment. The managed directory service 202 may provide customers and other users who have been authorized to access a managed directory with an interface 204 that may enable the customer or a delegated user to access the managed directory service 202. A customer or a delegated user may utilize the interface 204 through one or more communications networks, such as the Internet. The interface 204 may comprise certain security safeguards to ensure that the customer or delegated user has authorization to access the managed directory service 204. For instance, in order to access the managed directory service 202, a customer may need to provide a username and a corresponding password or encryption key when using the interface 202. Additionally, requests (e.g., API calls) submitted to the interface 204 may require an electronic signature generated using a cryptographic key such that the electronic signature is verifiable by the managed directory service 202, such as by an authorization system (not shown).

Through the interface 204, the customer or delegated user may be able to submit a request to assign a particular alias to a customer directory 214. As noted above, the alias may be used to provide a domain name to the customer directory 214, which may make it easier for users to access the customer directory 214. For instance, the computing resource service provider may affix an alias to the top-level and second-level domain name labels to generate a domain name for the customer directory 214 (e.g., "X.example.com", where "X" is the alias that is appended to the computing resource service provider's top-level and second-level domain name labels "example.com"). The managed directory service 202 may include a management sub-system 206 that may be configured to receive the request received through the interface 204. Upon receiving the request from the interface, the management sub-system 206 may communicate with a DNS service 210 to determine whether the alias has been previously assigned to another customer. If the alias has been previously assigned to another customer, the management sub-system 206 may deny the customer's request. Otherwise, the management sub-system 206 may again communicate with the DNS service 210 to determine whether any placeholders are specified within the DNS database that may include the requested alias. If so, the management sub-system 206 may obtain an encrypted alias record from the DNS service 210.

The DNS service 210 may include a DNS database 212, which may include one or more placeholders usable to reserve certain aliases for particular customers and one or more encrypted copies of an alias record. The alias record may specify an associated identifier of the customer for whom the placeholder has been reserved for. For instance, the DNS database may specify, through the encrypted alias record, that the placeholder "X/000.example.com" is reserved for a particular customer, where "/000" is the control character for the domain name. Additionally, the DNS database may further specify domain names that have been assigned to computing resources provisioned for other customers. These domain names would not include the control character but rather would include the alias assigned to the customer within the domain name. For instance, if a customer has previously reserved the alias "Y", the DNS database may specify that "Y.example.com" is associated with a customer resource. As noted above, the alias record for each placeholder entry within the DNS database may be encrypted utilizing a cryptographic key and a salt or initialization vector. The salt of initialization vector may be used to provide additional input to the encryption process to defend against dictionary and rainbow table attacks against the encrypted alias record. The cryptographic key and the salt or initialization vector may be provided to the managed directory service 202 to decrypt the alias record. Thus, if any unauthorized entities obtain the alias record, these entities may be unable to identify the customers for whom the aliases have been reserved. While encryption is used throughout the present disclosure for the purpose of illustration, other methods may be used to obfuscate the contents of the alias record. For instance, in an embodiment, the DNS service 210 specifies, within the alias record, one or more values that may be used to access a database that is inaccessible to the general public but accessible to the one or more services provided by the computing resource service provider. Thus, in this particular embodiment, the alias record need not be encrypted to ensure the security of the reserved aliases and the customers for whom these aliases have been reserved.

Once the management sub-system 206 has obtained the alias record from the DNS service 210, the management sub-system 206 may utilize a cryptographic key and a salt or initialization vector to decrypt the alias record and determine whether the requested alias is reserved for the particular customer and may be used for the customer directory 214. For instance, the management sub-system 206 may evaluate the alias record to determine whether the customer identifier included within the alias record corresponds to the customer identifier for the customer that submitted the request to the managed directory service 202. In order to make this determination, the management sub-system 206 may access one or more user profiles 208 to obtain an identifier for the customer that submitted the request and determine whether the alias record specifies a the customer's identifier. The management sub-system 206 may deny the customer's request and may cause the interface 204 to display a notification to the customer if the requested alias is not available or has not been reserved for the customer.

If the requested alias is available or has been reserved for the customer, the management sub-system 206 may assign the alias to the customer directory 214 and communicate with the DNS service 210, such as through one or more API calls to the service, to notify the DNS service 210 that the alias has been assigned. In response to the notification from the management sub-system 206 of the managed directory service 202, the DNS service 210 may update the DNS entry for the customer directory 214 and update the DNS database to indicate that the alias has been assigned. For instance, in an embodiment, the DNS service 210 updates the DNS database to include, in addition to the placeholder, the newly created domain name and the associated location of the customer directory 214. Thus, if an entity enters the newly assigned domain name into a browser application, the entity may be able to access the customer directory 214. Additionally, the DNS service 210, upon query from any other entity in any data region (e.g., regional DNS service nodes, other services, other customers, etc.), may provide the updated DNS database entry to prevent erroneous assignment of the alias.

The DNS service 210 may also be configured to update the DNS database in the event that a customer has specified that an alias previously assigned to him/her should be released. For instance, if the DNS service 210 receives a notification from the managed directory service 202 that a customer has terminated his/her account, has terminated his/her customer directory 214 and/or has specified that the alias should be released, the DNS service 210 may update the DNS entry for the customer directory 214 such that the previously assigned domain name may no longer be utilized to access the customer directory 214. Additionally, if the alias was previously reserved, the DNS service 210 may update the DNS database to remove the domain name entry for the customer directory 214, leaving behind the placeholder that includes the previously assigned alias and a control character (e.g., "X/000.example.com", where "X" is the previously assigned alias and "/000" is the control character). Thus, if the customer at a later time submits a request to reclaim the alias, he/she may be able to. Furthermore, this prevents other customers from obtaining the alias.

Figure 3:
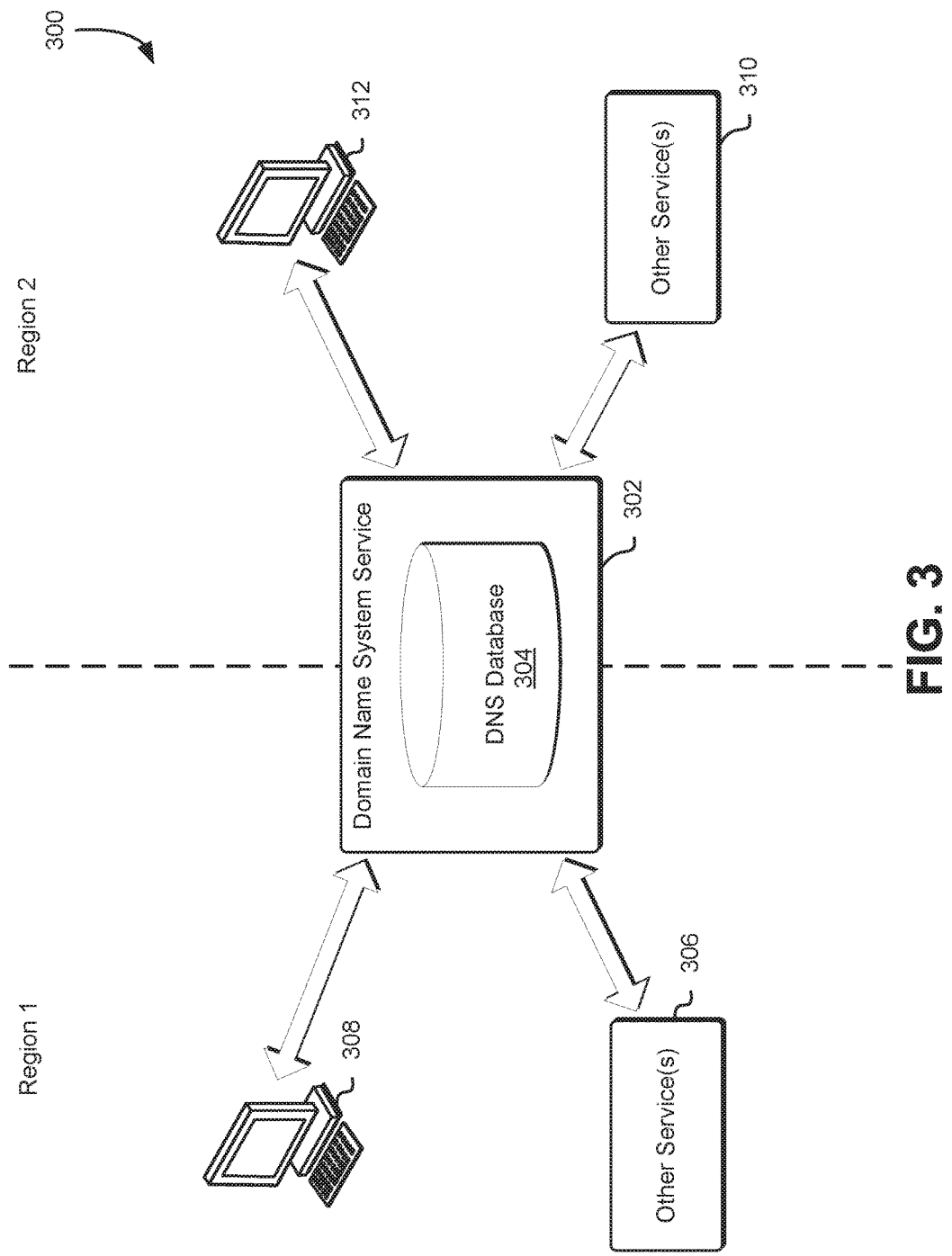
FIG. 3 shows an illustrative example of an environment in which a domain name system service processes one or more domain name queries from services and other entities in accordance with at least one embodiment.

As noted above, the DNS service may include a DNS database wherein an alias record may be stored for each placeholder within the DNS database for aliases reserved for particular customers. In order to ensure that each data region is able to identify any reserved or otherwise assigned aliases, the DNS service may perform a replication process with other DNS service instances in the other data regions. Accordingly, FIG. 3 shows an illustrative example of an environment 300 in which a DNS service 302 processes one or more domain name queries from services 306, 310 and/or computing systems 308, 312 in accordance with at least one embodiment. As noted above, the DNS service 302 may include a DNS database 304 that specifies one or more domain names assigned to one or more computing resources, one or more domain name placeholders usable to reserve one or more aliases for particular customers and one or more alias records for each placeholder. This alias record for each placeholder may specify a customer identifier corresponding to a customer for whom the alias included within the placeholder has been reserved. This alias record may be made available to all requesting entities. However, the alias record may be encrypted and the one or more cryptographic keys and salts or initialization vector that may be needed to decrypt the alias record may be provided only to authorized entities and/or services provided by the computing resource service provider.

As illustrated in the environment 300, the alias record stored within the DNS database 304 may be available to one or more other services 306,310 and/or computer systems 308, 312 upon request. For instance, as noted above, a managed directory service within a particular data region may communicate with the global DNS service 302 to obtain the alias record if it is determined that a placeholder comprising the requested alias has been specified within the DNS database 304. The managed directory service may maintain a cryptographic key, which may be used to decrypt the alias record and utilize the data included therein. In an embodiment, the managed directory service determines, based at least in part on a request to assign a particular alias to a customer directory, whether the alias is available by submitting a query specifying the alias to the DNS service 302. The DNS service 302 may access the DNS database 304 to determine whether the alias specified within the query is included in any of the domain names assigned to other computing resources. If so, then the DNS service 302 the managed directory service that the alias has already been assigned, causing the managed directory service to deny the request. If the DNS database 304, however, does not include such an entry, the managed directory service may submit an additional query specifying the alias and one or more control characters to determine whether the DNS database 304 specifies a domain name placeholder that includes the alias and the one or more control characters. If the DNS service 302 is able to identify a placeholder that satisfies this query, the DNS service 302 may obtain from the DNS database 304 an alias record that may be provided to the managed directory service.

The managed directory service may utilize the alias record to determine whether the requested alias has been previously reserved for another customer. As noted above, the DNS database 304 may specify one or more placeholders that may correspond to aliases that are reserved for certain customers. A placeholder may include a top-level domain name label, a second-level domain name label, one or more control characters and the alias that is reserved for a particular customer. An example of a placeholder may include "X/000.example.com", where "X" is the alias, "/000" is the control character and "example.com" is the domain name, including the top-level and second-level domain name labels.

If the requested alias is available for the customer, the managed directory service may assign the alias to the customer's directory and communicate with the DNS service 302, such as through one or more API calls to the service, to specify that the alias has been assigned. Accordingly, the DNS service 302 may access the DNS database 304 to create the domain name that is to be used by other users, such as through a browser application to access the customer's directory or other computing resource. Once the alias record has been updated, the DNS service 302 may make the modified DNS database 304 available to other DNS service nodes within the data regions. For instance, if other services 306, 310 or computing systems 308, 312 within a different data region submit a query to a DNS service node within their respective data regions to determine whether a particular alias is available, the DNS service nodes may submit a query to the global DNS service 302 to determine whether it has an authoritative (e.g., more recent) version of the DNS database 304. If the DNS service 302 does have a more recent version of the DNS database 304, the DNS service 302 may provide the requesting DNS service node with an authoritative response to the query, which may include the alias record for a particular placeholder if the query from the other services 306, 310 or computing systems 308, 312 involves determining whether a particular alias is reserved for a customer. Thus, the requesting DNS service node may be able to provide the latest alias record to the other services 306, 310 and/or computing systems 308, 312. Further, these DNS service nodes may be able to maintain and update a cache information from the DNS database 304 within their respective data regions. This obviates the need to continuously communicate with the global DNS service 302 to obtain the requested alias record.

Figure 4:
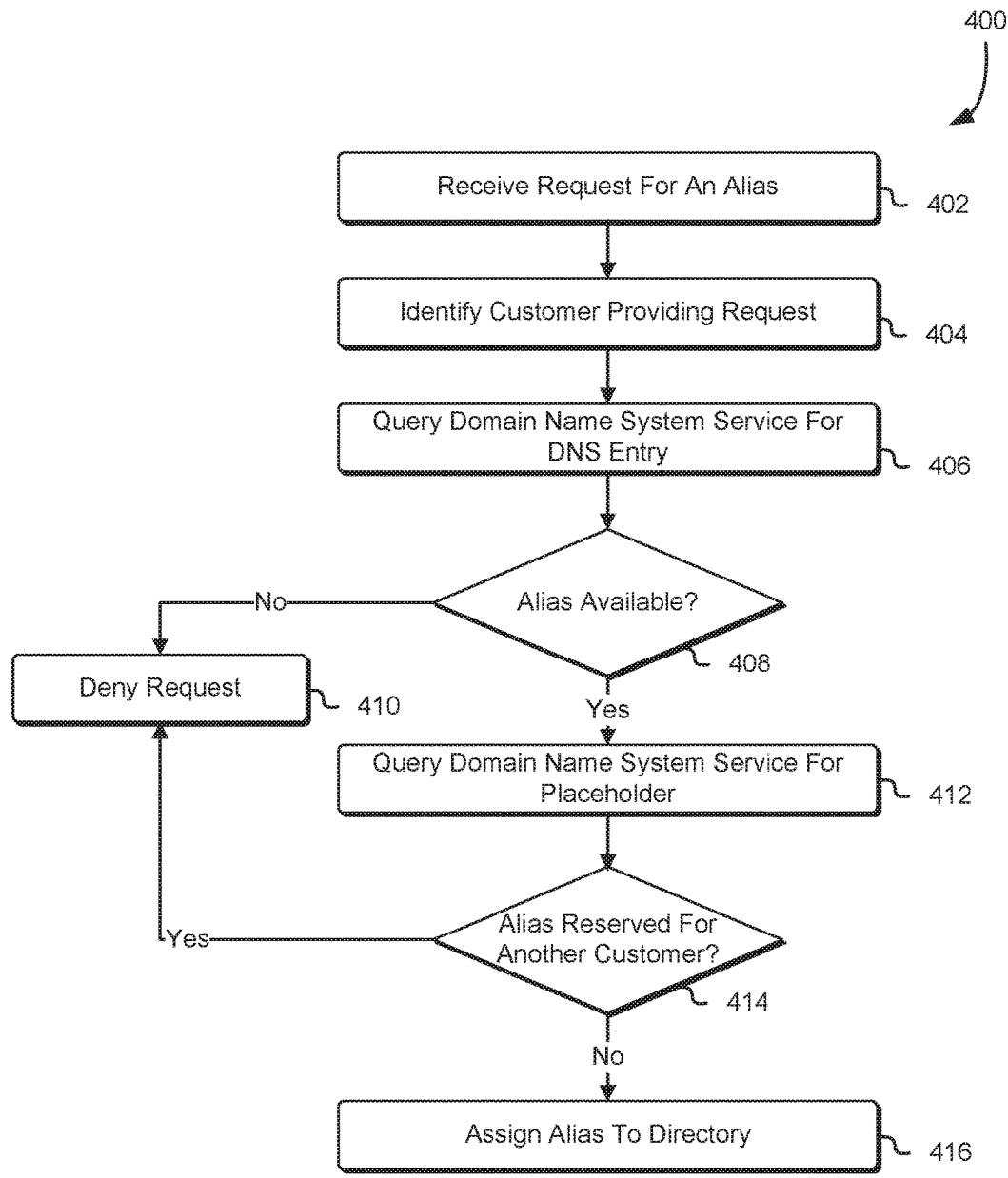
FIG. 4 shows an illustrative example of a process for assigning an alias to a particular customer directory in accordance with at least one embodiment.

As noted above, the managed directory service may be configured to determine whether a particular alias may be assigned to a particular directory managed and operated by a customer. Accordingly, FIG. 4 shows an illustrative example of a process 400 for assigning an alias to a particular customer directory in accordance with at least one embodiment. The process 400 may be performed by the aforementioned managed directory service, which may be configured to process customer requests for assigning a particular alias to a customer directory. Further, the managed directory service may be configured to communicate with a DNS service to determine whether the alias is available, obtain an alias record for identifying whether the particular alias is reserved for the customer and to notify the DNS service of any alias assignments.

A customer of the computing resource service provider may operate and manage one or more directories through a managed directory service. The customer may want to make the directory more easily accessible to other users of the directory. For instance, it may be easier for a user to recall and utilize a domain name, such as "X.example.com", rather than an IP address that may change over time more frequently than the domain name. Thus, the customer may submit a request, through an interface provided by the managed directory service, to assign a particular alias to his/her directory. The request may include the alias the customer wants to have assigned to his/her directory, as well as one or more customer identifiers, which may be used to identify the customer. The managed directory service may receive 402 this request for a particular alias and, based at least in part on the information included within the request, identify 404 the customer providing the request. For instance, if the request includes a customer identifier, the managed directory service may access one or more user profiles to obtain additional information regarding the customer (e.g., name, location, associated organizations, etc.).

Once the managed directory service has obtained the request from the customer for a particular alias and has identified the customer that has submitted the request, the managed directory service may communicate with a DNS service, such as through one or more API calls to the service, to query 406 the DNS service for a DNS entry that includes the requested alias. As noted above, the DNS database may specify one or more domain names that may have been assigned for other computing resources and other customers. These domain names may each include an alias that comprises a lower level domain label, a top-level domain label and a second-level domain label. Additionally, the DNS database may identify the associated computing resources for each domain name. Thus, if an entity provides, through a browser application, a URL that includes the domain name, the DNS service may refer to the DNS database to identify the one or more computing resources that may correspond to the domain name included in the URL and direct the entity to these one or more computing resources.

In addition to the assigned domain names, the DNS database may further specify one or more domain name placeholders, which may include one or more reserved aliases for certain customers of the computing resource service provider. For instance, as noted above, these domain name placeholders may differ from the domain names assigned to customers of the computing resource service provider in that the domain name placeholders may include one or more control characters, such that the placeholder may not be used for accessing computing resources. For example, the DNS database may include a proxy name, "X/000.example.com", wherein "X" denotes the particular alias that is reserved for a certain customer and "/000" is the control character. For each of these placeholders, the DNS database may include an encrypted alias record, which may further specify the particular customer or potential customer for whom the alias is reserved for.

Once the managed directory service submits the query to the DNS service, the managed directory service, based at least in part on a response to the query from the DNS service, may determine 408 whether the requested alias is available. As noted above, the DNS database may include one or more domain names associated with one or more computing resources. These domain names may include, within a sub-domain label of the domain name, an alias that has been previously assigned to a particular computing resource. Thus, if the managed directory service determines that the requested alias is included in an existing domain name specified within the DNS database, then the alias may not be available. If the requested alias is not available, the managed directory service may deny 410 the customer's request to have the alias assigned to his/her directory.

If the requested alias is not included in any portion of the previously assigned domain names, the managed directory service may query 412 the DNS service for any placeholders within the DNS database that include the requested alias. As noted above, the computing resource service provider may reserve certain aliases for particular customers. For instance, if a customer exhibits significant usage of computing resources or has provisioned a significant amount of these computing resources, the computing resource service provider may determine that this customer is a high volume customer that should be provided with the opportunity to assign an alias to his/her particular computing resources. The computing resource service provider may include a DNS entry within the DNS database that includes a domain name placeholder for these reserved aliases. Additionally, the computing resource service provider may include, for each domain name placeholder entry within the DNS database, an encrypted alias record. This encrypted alias record may specify the identity of the customer for whom the particular alias has been reserved.

While customer requests to assign particular aliases are used throughout the present disclosure for the purpose of illustration, the managed directory service or another service utilizing techniques described herein may receive requests from the customer or other entity to perform any other operations or cause other operations to be performed, such as by a computer system or one or more services. For instance, a customer or other entity may submit a request to maintain, as an encrypted record entry within the DNS database, a customer-specific cryptographic key which may be provided to the customer. This customer-specific cryptographic key may be utilized by the customer to decrypt any sensitive customer data or information maintained by the customer within his/her computing resources. Further, the customer may authorize other entities to access this customer-specific cryptographic key to enable these entities to access customer information and data. In another instance, a customer may submit a request to a managed directory service to create a new managed directory. The managed directory service may obtain, from the DNS service node or the DNS service an encrypted record specifying one or more policies specifying whether the managed directory service may fulfill the request. Thus, the process 400 may be performed to determine whether a customer or other entity is authorized to perform any actions (operations).

As noted above, the domain name placeholder may include may include one or more control characters, such that the placeholder may not be used for accessing computing resources. The query from the managed directory service may include a character string that includes the requested alias and these one or more control characters, such that the DNS service may utilize this information to identify any placeholders within the DNS database that include the requested alias. Additionally, the query may include one or more commands to retrieve the encrypted alias record for any placeholders within the DNS database that include the alias. Thus, if the DNS service identifies a placeholder that includes the requested alias and control characters included in the query, the DNS service may provide the encrypted alias record to the managed directory service. In an embodiment, the query further includes an encryption key and a salt or initialization vector that may be used to decrypt the alias record. Thus, if the DNS service identifies an appropriate placeholder that includes the requested alias and control characters, the DNS service may utilize the provided encryption key and salt or initialization vector to decrypt the alias record corresponding to the domain name placeholder and provide the decrypted alias record to the managed directory service in response to the query.

Once the managed directory service has received the alias record from the DNS service, the managed directory service may determine 414 whether the requested alias has been reserved for another customer. As noted above, the alias record obtained from the DNS service may be encrypted. The managed directory service may utilize a cryptographic key (e.g., AES-256 symmetric key, etc.) and one or more salts or initialization vectors to decrypt the received alias record and obtain a customer identifier of the customer for whom the alias has been reserved. The managed directory service may then be able to determine whether the customer identifier for the customer that submitted the request is associated with these placeholders (e.g., the customer identifier provided by the customer and the customer identifier included within the alias record match). Thus, if the customer identifier is not associated with these placeholders, the managed directory service may determine that the placeholders are reserved for another customer and deny 410 the customer's request.

If the requested alias is not included within the DNS database (e.g., in a domain name placeholder or in an assigned domain name) or the requested alias is included in a placeholder reserved for the customer that submitted the request, the managed directory service may assign 416 this particular alias to the customer's directory. Additionally, the managed directory service may communicate with the DNS service node within its particular data region or the global DNS service to notify the DNS service of the assignment of the alias. This may enable the DNS service to update the DNS entry for the customer's directory, update the DNS database and provide an up-to-date authoritative response in the event a DNS service node within any data region submits a query to determine where the newly assigned domain name should be directed towards.

Figure 5:
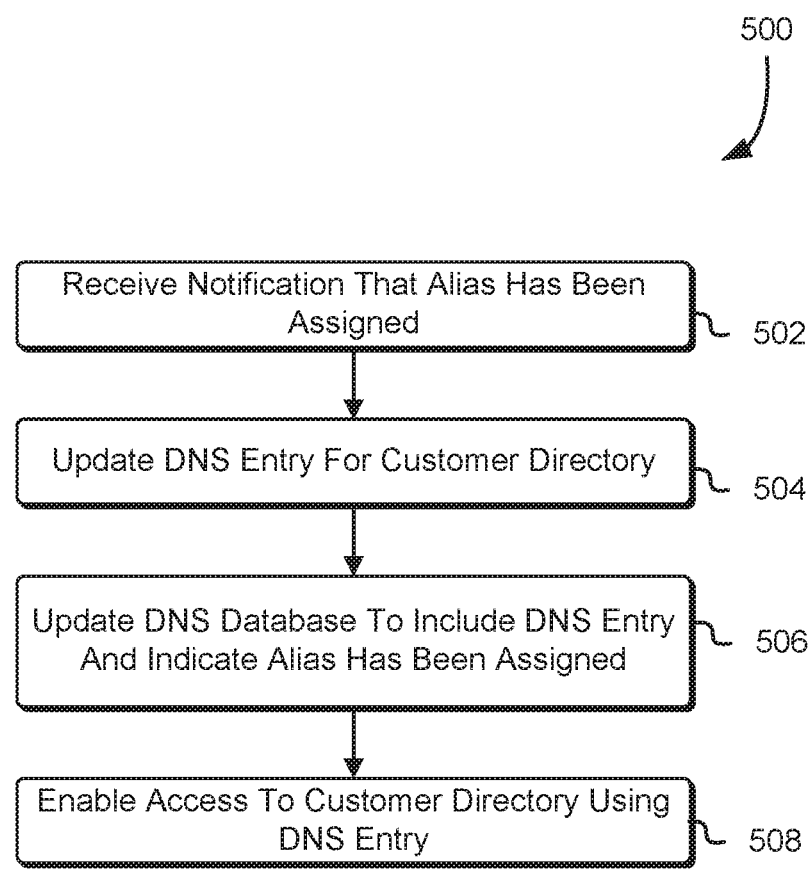
FIG. 5 shows an illustrative example of a process for updating a domain name system database upon notification of assignment of an alias in accordance with at least one embodiment.
Figure 6:
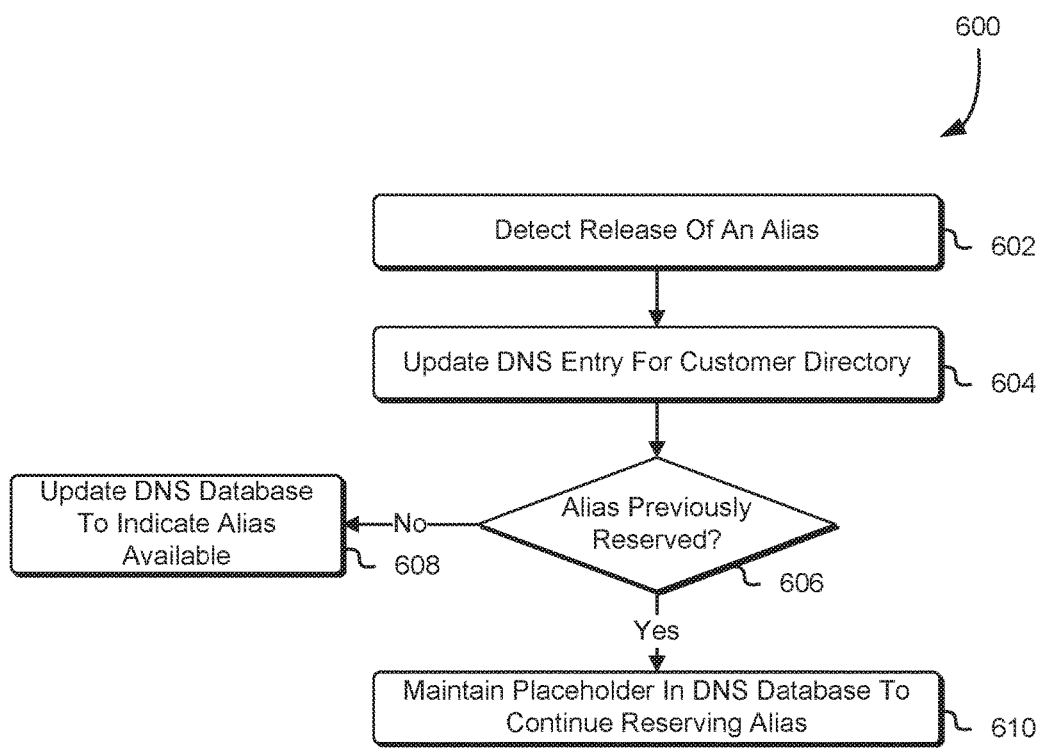
FIG. 6 shows an illustrative example of a process for updating a domain name system database upon detecting that an alias has been released by a customer in accordance with at least one embodiment.

As noted above, the DNS service may be configured to manage and update a DNS database that includes one or more domain names assigned to particular computing resources, one or more domain name placeholders that may include aliases reserved for particular customers and, for each domain name placeholder, an encrypted alias record that may be used to specify the customer for whom the alias has been reserved. This DNS database may be updated based at least in part on an assignment of an alias by a managed directory service. Accordingly, FIG. 5 shows an illustrative example of a process 500 for updating a DNS database upon notification of assignment of an alias in accordance with at least one embodiment. The process 500 may be performed by the aforementioned DNS service, which may be configured to communicate with a managed directory service within any particular data region, as well as services in any data region and one or more computing resources that may submit a request to obtain the alias record corresponding to a domain name placeholder within the DNS database.

When the managed directory service within a particular data region obtains the alias record from the DNS service and determines that the alias is available for the customer that submitted the request to obtain the alias, the managed directory service may assign the alias to the customer's directory and communicate with the DNS service, such as through one or more API calls to the service, to notify the DNS service of the assignment. The DNS service may receive 502 this notification that the alias has been assigned to the customer's directory and update 504 the DNS entry for the directory. For instance, the DNS service may associate a domain name that includes the assigned alias as a sub-level domain level to an IP address associated with the customer's directory. Thus, when a user enters the domain name into a browser application, the user may be able to access the customer's directory through the browser application.

Once the DNS entry has been updated for the customer directory, the DNS service may update 506 the DNS database to include a domain name associated with the directory to indicate that the alias has now been assigned. For instance, the DNS service may access the DNS database and identify, based at least in part on the assigned alias included within the notification, the domain name placeholder that includes the alias. For example, if the assigned alias is "X", the DNS service may perform a keyword search for "X" within the alias record to identify the placeholder (e.g., "X/000.example.com") that includes the alias. The DNS service may, based at least in part on this placeholder, create an entry that includes the domain name for the customer directory (e.g., "X.example.com"). The DNS service may retain an entry for the domain name placeholder within the DNS database such that if the customer or the managed directory service releases the particular alias, the DNS service may remove the domain name associated with the customer directory from the DNS database but retain the placeholder. If the DNS database did not include a placeholder for the assigned alias, the DNS service may create a domain name entry that includes the assigned alias as a sub-level domain label within the DNS database.

As a result of updating the DNS database to include the newly created domain name for the customer directory, the DNS service may have an authoritative answer as to the one or more computing resources associated with the newly created domain name. Thus, when DNS services nodes within each data region submit a query to the DNS service with regard to the domain name and the associated computing resource, the DNS service may enable 508 access to the customer directory using the DNS entry within the DNS database. In an alternative embodiment, upon receiving the query from DNS service nodes with regard to the domain name, the DNS service may respond to the query by providing the DNS service nodes with the domain name entry that corresponds to the computing resource. This enables the DNS service nodes to cache the DNS entry within their own versions of the DNS databases for use by other services, such as the managed directory service.

As noted above, the DNS service may also be configured to release a DNS entry for a particular computing resource, such as a customer directory, if the customer or other service provided by the computing resource service provider releases the customer's assigned alias. Accordingly, shows an illustrative example of a process 600 for updating a DNS database upon detecting that an alias has been released by a customer or a service in accordance with at least one embodiment. The process 600 may be performed by a DNS service configured to communicate with one or more services, such as a managed directory service, to receive notifications concerning release of one or more aliases. Further, the DNS service may be configured to access and modify an existing DNS database to update any domain name entries, domain name placeholder entries and other information that may be affected by the release of the particular alias.

In an embodiment, the managed directory service receives a request from a customer to terminate his/her directory or otherwise release the alias previously assigned to his/her directory. Alternatively, the managed directory service may release the alias previously assigned to the directory in response to a triggering event (e.g., the customer account has been compromised, the directory has been compromised, etc.). In response to the request or some other triggering event, the managed directory service may release the alias from the directory and notify the DNS service, such as through one or more API calls to the service, that the alias has been released. In this manner, the DNS service may detect 602 the release of an alias. Alternatively, the DNS service may receive, from DNS service nodes in a variety of data regions, notification that an alias has been released.

Once the DNS service has detected, such as through notification from a managed directory service or a DNS service node in a particular data region, that an alias has been released, the DNS service may update 604 the DNS entry for the particular customer directory. As noted above, the DNS service may associate a domain name that includes the assigned alias as a sub-level domain level to an IP address associated with the customer's directory. Thus, when a user enters the domain name into a browser application, the user may be able to access the customer's directory through the browser application. As a result of the alias having been released, the DNS service may disassociate the domain name from the customer's directory such that a user utilizing the domain name within a browser application may no longer be able to access the customer's directory.

As noted above, the DNS database managed by the DNS service may specify one or more domain names that may be associated with one or more computing resources provided by the computing resource service provider and assigned to one or more customers of the computing resource service provider. Additionally, the DNS database may specify one or more domain name placeholders for each alias that may be reserved for a particular customer or were previously reserved for a customer but have been utilized to assign a domain name to a customer directory. Thus, the DNS service may determine 606 whether the released alias was previously reserved for the customer. If the released alias was not previously reserved for a particular customer, the DNS service may update 608 the DNS database to indicate that the alias is now available for assignment. For instance, the DNS service may locate the domain name entry within the alias record that includes the released alias and remove this domain name entry. Thus, if a managed directory service or another service submits a query to the DNS service to determine whether the alias is available for assignment, the DNS service may be able to determine for these other services that the alias may be assigned for the particular customer.

If the released alias was previously reserved for the customer, the DNS service may maintain 610 the existing placeholder in the DNS database in order to specify that the alias is still reserved for the customer. For example, if the domain name previously assigned to a computing resource was "X.example.com", where "X" is the alias that was reserved for a particular customer, the DNS service may maintain the existing placeholder (e.g., "X/000.example.com") within the DNS database. Additionally, the DNS service may modify, generate or associate an alias record with the domain name placeholder. This alias record may specify which customer may be assigned the alias that has now been reserved. Thus, no entity other than the customer may be able to request assignment of the reserved alias, making the reserved alias available to the customer if the customer at a later time decides that he/she would like to assign the alias to a particular computing resource.

Figure 7:
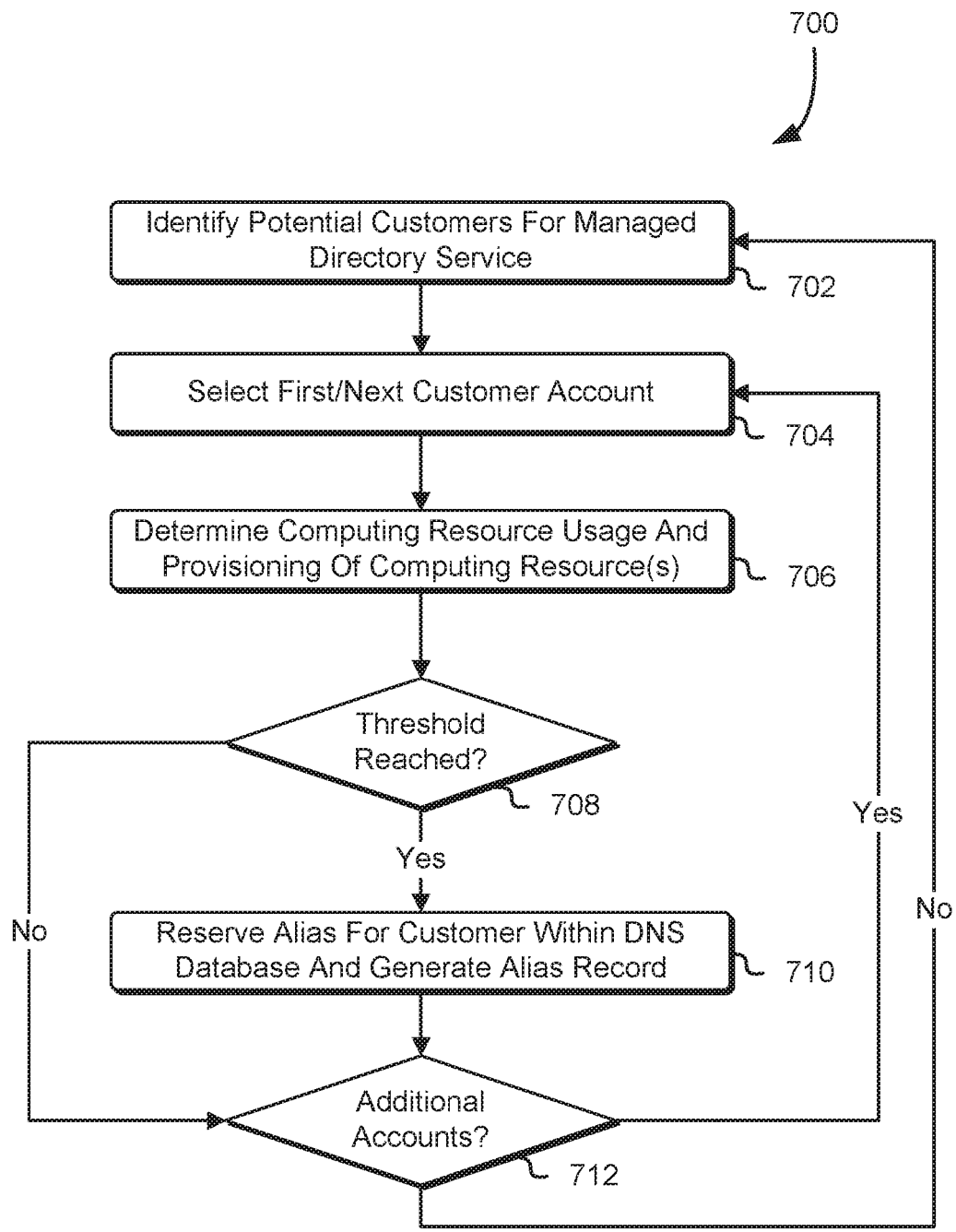
FIG. 7 shows an illustrative example of a process for reserving an alias within a domain name system database based at least in part on computing resource usage and provisioning in accordance with at least one embodiment.

As noted above, certain aliases may be reserved for particular customers based at least in part on certain criteria. These reserved aliases may be included within a DNS database, managed by a DNS service, through one or more domain name placeholders and, for each placeholder, an alias record specifying an identifier of the customer for whom the alias is reserved for. Accordingly, FIG. 7 shows an illustrative example of a process 700 for reserving an alias within a DNS database based at least in part on computing resource usage and provisioning in accordance with at least one embodiment. The process 700 may be performed by a managed directory service, an account service or other services provided by a computing resource service provider that may be configured to evaluate customer usage and/or provisioning of computing resources. Additionally, the managed directory service, account service and/or other services may be configured to communicate with a DNS service to cause the DNS service to reserve certain aliases within the DNS database by utilizing one or more placeholders and alias records.

In an embodiment, the managed directory service or other service is configured to identify 702 one or more potential customers that may, at some point, utilize the managed directory service to manage and operate a customer directory. For instance, the managed directory service or other service may access one or more user profiles to determine whether a customer may potentially utilize the managed directory service in the future to manage and operate a managed directory. For example, a user profile for a particular customer may include information (e.g., name, address, e-mail address, billing information, computing resources provisioned, etc.) that, through use of one or more heuristics and/or algorithms, may indicate that the customer may utilize the managed directory service in the future. Alternatively, the managed directory service or other service may determine whether a customer operates and on-premises (relative to the customer) network, including a managed directory, which may be further enhanced through use of the managed directory service. Thus, the managed directory service or other service may be able to specify any potential customers.

Once the managed directory service or other service has identified one or more potential customers that may utilize the managed directory service, the managed directory service or other service may select 704 a first customer from the one or more potential customers and determine 706 the computing resource usage of the customer and the one or more computing resources that the customer may have provisioned. For instance, the managed directory service or other service may evaluate the customer's user profile or other profile to determine which computing resources the customer has provisioned over a particular period of time or has provisioned in aggregate. Additionally, or alternatively, the managed directory service or other service may access the customer's accounting information to determine how much money a customer is spending over the particular period of time to provision and utilize these computing resources. In an alternative embodiment, the managed directory service or other service is provided with a database of companies and/or entities that are well-known throughout the business community or in a communications network, such as the Internet. Thus, the managed directory service or other service may determine whether the customer is representative of any of these companies or well-known entities, as specified within the database.

Based at least in part on the determination of computing resource usage and of the amount of computing resources provisioned by the selected customer, the managed directory service or other service may be able to determine 708 whether a certain threshold has been reached for reserving an alias for the customer. For instance, the computing resource service provider may establish a threshold for determining whether a customer utilizes a sufficient volume of computing resources to be considered a high-volume customer. For the computing resource service provider, it may be desirable to reserve particular aliases for these high-volume customers to grant them the opportunity to utilize these aliases and prevent others from potentially using these aliases to extort these high-volume customers or use these aliases for nefarious purposes (e.g., impersonating these high-volume customers, etc.).

If the selected customer's usage of computing resources has reached the particular threshold established by the computing resource service provider, the managed directory service or other service may communicate with a DNS service, such as through one or more API calls to the service, to reserve 710 an alias for the customer within the DNS database. As noted above, the DNS database may specify which aliases have been assigned. Additionally, the DNS database may specify which aliases are reserved for particular customers. For instance, the DNS database may specify one or more domain names that are in use by customers of the computing resource service provider. These domain names may include, within the sub-domain name label, an alias assigned to the particular customer (e.g., "X.example.com" where "X" is the alias utilized as a sub-domain name label). The reserved aliases may be included within the DNS database as part of one or more placeholders. These placeholders may include the alias for the customer, as well as one or more control characters that may be used to distinguish these placeholders from actual domain names in use. For instance, the placeholder "X/000.example.com" includes the alias "X", the control character "/000" and the top-level and second-level domain name labels "example.com". Additionally, for each domain name placeholder, the DNS service may store an encrypted alias record. This encrypted alias record may be stored within the DNS database as a TXT record for the domain name placeholder. Alternatively, storing the encrypted alias record may include sending the record to another entity that hosts the DNS. This alias record may specify the identity of the customer for whom the alias is reserved. Thus, the managed directory service or other service may reserve, within the DNS database, a placeholder that includes the particular alias identified for the customer.

If the customer has not reached the particular threshold required to have an alias reserved for him/her or the managed directory service or other service has reserved an alias for a customer within the DNS database, the managed directory service or other service may determine 712 whether any additional accounts remain to be analyzed. If additional accounts remain, the managed directory service or other service may select 704 the next customer account and again determine the computing resource usage and computing resources provisioned by this customer. However, if no accounts remain to be analyzed, the managed directory service or other service may attempt to identify 702 any potential new customers for the managed directory service.

It should be noted that the process 700 as illustrated in FIG. 7 is illustrative of one method for reserving an alias within an alias record. Accordingly, the process 700 may include additional or fewer actions that may be performed by the managed directory service or other service in determining whether a particular alias should be reserved for a customer. For instance, in an embodiment, the managed directory service or other service may access a database that specifies one or more customers associated with Fortune 500 companies. Based at least in part on this database, the managed directory service or other service may identify these customers and reserve an alias for each of these customers. Additionally, or alternatively, the managed directory service or other service may perform a trademark query through one or more governmental agencies to identify one or more assignees for particular registered trademarks. The managed directory service or other service may reserve an alias corresponding to these registered trademarks for any of these assignees.

Figure 8:
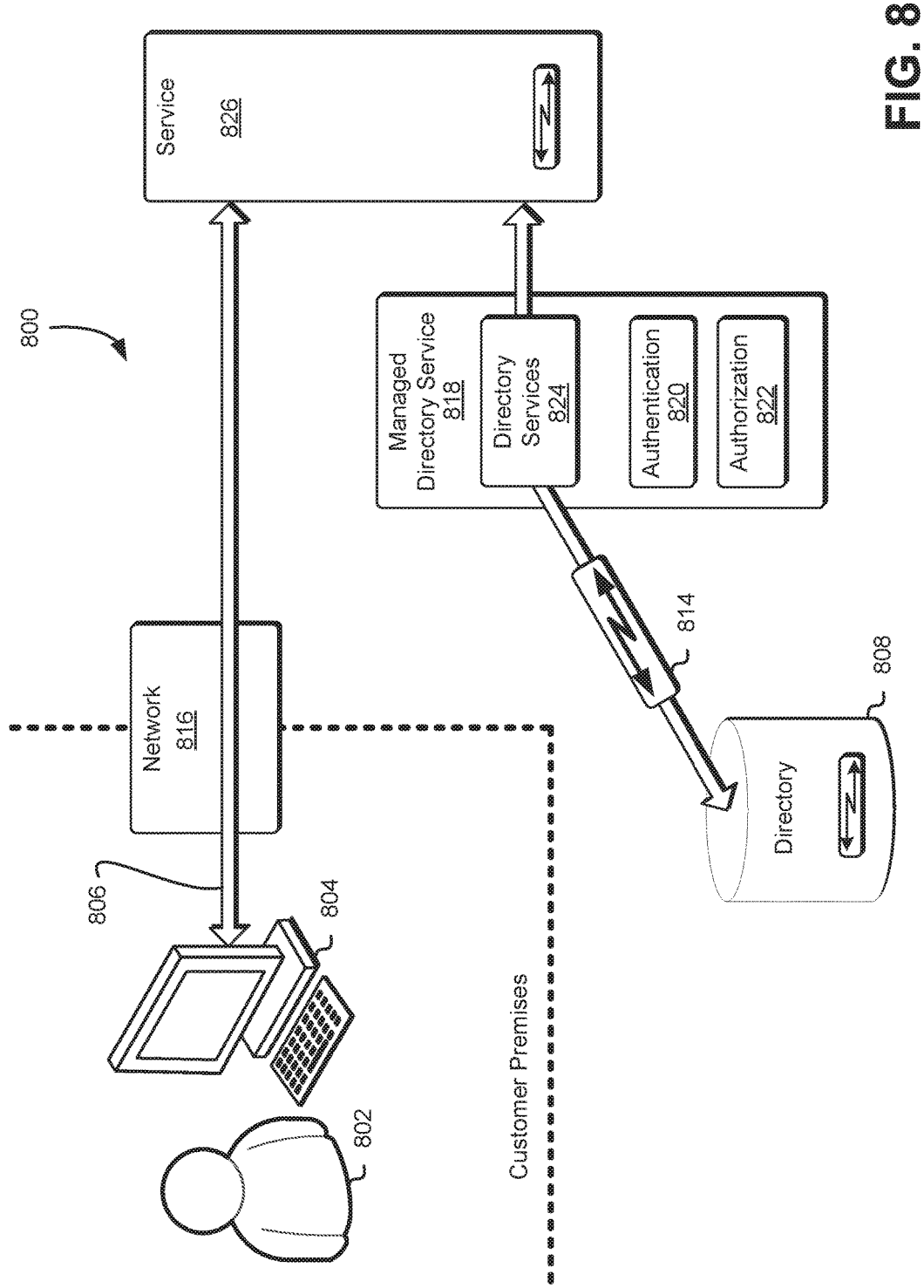
FIG. 8 shows an illustrative example of an environment in which local and remote computer system resources may be accessed by local and remote computer system entities in accordance with at least one embodiment.

FIG. 8 illustrates an environment 800 for accessing computer system directory resources that support directories. The directory resources may include, but are not limited to, computer system services such as directory services and resources such as user resources, policy resources, network resources and/or storage resources associated with the directory services, on distributed and/or virtualized computer system environments as well as the associated code running thereon. A user or process 802 may connect to a computer system through a computer system client device 804 and may request access via connection 806, over a network connection 816, to one or more services 826 in accordance with at least one embodiment. A computing environment (e.g., of a computing resource service provider) may include one or more computer system directories 808 which may be located at least in part outside of the customer premises in accordance with at least one embodiment. In some embodiments, the service 826 may need access computer system resources managed by the directory 808. Access (e.g., via a URL 814) to the computer system resources managed by the directory 808 may, in some embodiments, be provided by a service such as a managed directory service 818, which may provide access to one or more system resources managed by the directory 808. Access may include the ability to create the directory, delete the directory, extend the directory, connect to the directory, join the directory and/or other such directory management operations. For example, a user or process 802 may desire to join a virtual machine managed by a virtual machine service 826 to a directory 808 that the user or process previously created. A managed directory service may provide the access via the URL 814 and may, in some embodiments, provide authentication and/or authorization for the user or process 802 to join the directory.

The managed directory service may provide a variety of services to enable computer systems and/or computer system client devices to access system resources. For example, the managed directory service may provide authentication services 820 in accordance with at least one embodiment. The authentication services 820 which may authenticate credentials of a user, computer system, process, automated process or other such entity to at least determine whether that entity is authorized to access the managed directory service to, for example, create the directory, join to a domain of the directory and/or other such directory management functions. In some embodiments, the credentials may be authenticated by the managed directory service itself, or they may be authenticated by a process, program or service under the control of the managed directory service, or they may be authenticated by a process, program or service that the managed directory service may communicate with, or they may be authenticated by, a combination of these and/or other such services or entities.

In some embodiments, the managed directory service may provide 822 authorization services in accordance with at least one embodiment. The authorization services 822 may authorize a user, computer system, process, automated process or other such entity to at least determine which actions of one or more possible actions that entity may perform in connection with a directory managed by the managed directory service. For example, actions an entity may or may not be authorized to perform on a directory include, but are not limited to, creating the directory, describing a set of directories that include the directory, deleting the directory, extending the directory to another directory, creating and/or providing information about snapshots of the directory, deleting snapshots of the directory, restoring the directory from a snapshot of the directory, managing (adding/removing) tags associated with the directory, creating an alias for a URL for the directory, checking if an alias is available and/or deleting an alias for the URL of the directory. Once a directory is created, an administrator of the directory is able to, through the created directory, perform operations on the directory. For example, the administrator may perform actions such as creating file systems, destroying file systems, attaching to file systems, detaching from file systems, providing access links to file systems, reclaiming access links to file systems, allowing reads from file systems, allowing writes to file systems and/or other such file system resource actions.

The managed directory service may also provide directory services 824 which may provide an authenticated entity access 814 to computer system directory resources according to the authorization credentials and/or policies. For example, in an embodiment where a computer system entity may be authorized to read and write a certain data store on a file system resource, the ability to do so may be provided by the directory services 824. The directory services 824 may provide access to file system resources by providing links to the file system resource locations such as by a URL object or some other such linkage. In some embodiments, the URL may be provided by the computer system client device, or by a process running at the data center, or by a process running on a computer system connected to the datacenter, or by the managed directory service or by a combination of these and/or other such computer system entities.

Figure 9:
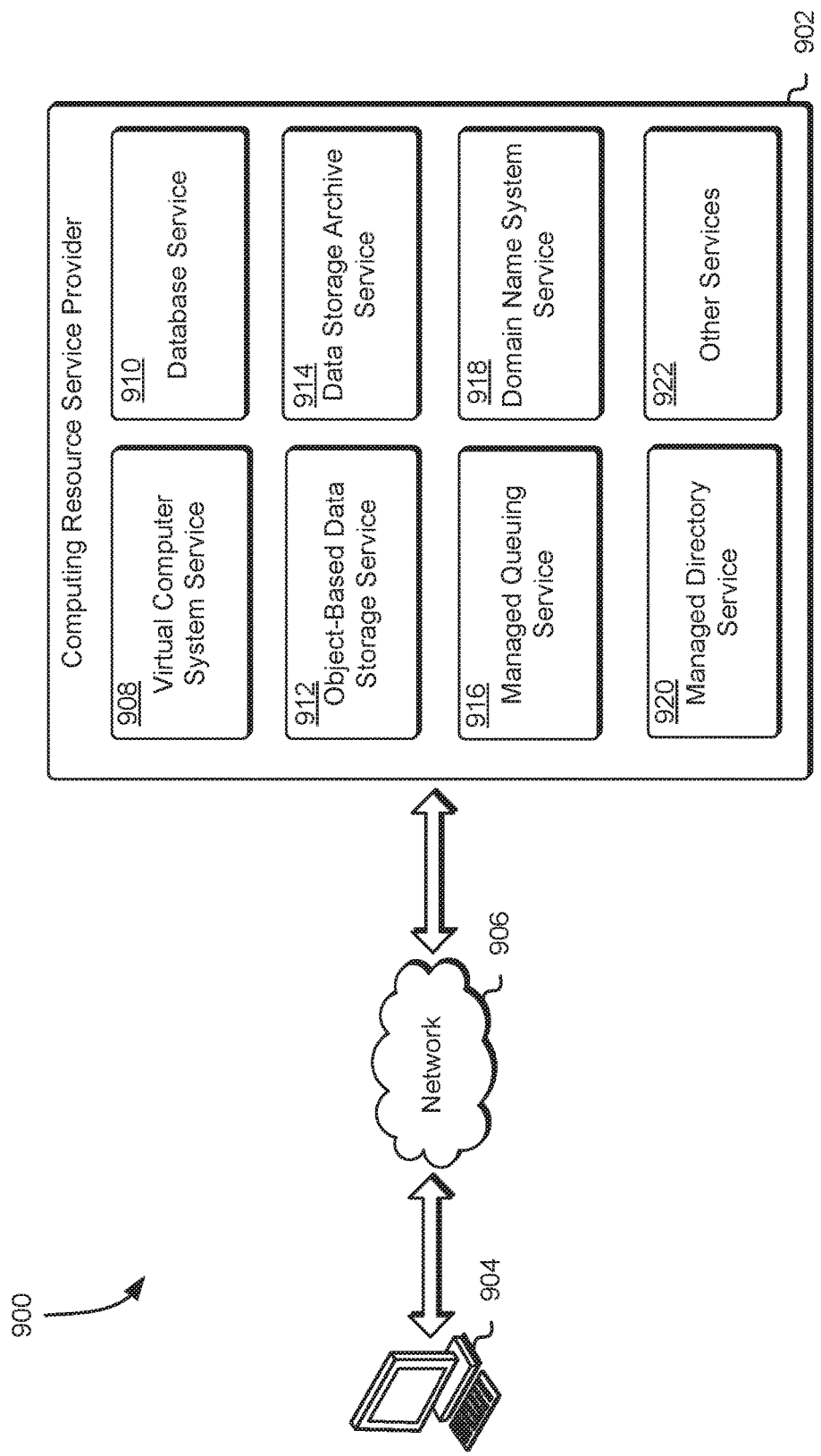
FIG. 9 shows an illustrative example of an environment in which various embodiments can be implemented.

FIG. 9 shows an illustrative example of an environment 900 in which various embodiments can be implemented. In the environment 900, a computing resource service provider 1102 may provide a variety of services to a customer 904 or other users. The customer 904 may be an organization that may utilize the various services provided by the computing resource service provider 902 to remotely generate and maintain one or more resources to support the customer's 904 business needs. As illustrated in FIG. 9, the customer 904 may communicate with the computing resource service provider 902 through one or more communications networks 906, such as the Internet. Some communications from the customer 904 to the computing resource service provider 902 may cause the computing resource service provider 902 to operate in accordance with various techniques described herein or variations thereof.

As noted above, a computing resource service provider 902 may provide various computing resource services to its customers. For instance, in this particular illustrative example, the computing resource service provider 902 provides at least seven types of services. The services provided by the computing resource service provider, in this example, include a virtual computer system service 908, a database service 910, an object-based data storage service 912, a data storage archive service 914, a managed queuing service 916, a DNS service 918, a managed directory service 920 and one or more other services 922, although not all embodiments of the present disclosure will include all such services and additional services may be provided in addition to or as an alternative to services explicitly described herein.

The virtual computer system service 908 may include one or more physical host computer systems comprising various hardware components for instantiating virtual computer system instances, one or more computer systems used to manage the virtual computer system instances and one or more other devices, such as computer systems providing a web-service frontend to the virtual computer system service 908. The virtual computer system service 908 may also include other computing resources, such as databases for managing information about virtual computer systems operated by the service and data storage devices for storing machine images used to instantiate virtual computer systems. The physical hosts may include one or more processors, one or more data storage devices (e.g., solid-state drives or magnetic disk drives), random-access memory (RAM) and other components that may be necessary to instantiate and support a virtual machine instance on behalf of the customers 904 of the computing resource service provider 902. Customers 904 of the computing resource service provider 902 may interact with the virtual computer system service 908 to provision and operate virtual computer systems that are instantiated on physical computing devices hosted (e.g., physical hosts) and operated by the computing resource service provider 902. The virtual computer systems may be used for various purposes, such as to operate as servers supporting a website. Other applications for the virtual computer systems may be to support database applications, electronic commerce applications, business applications and/or other applications.

The database service 910 may include one or more computer systems and one or more storage devices (e.g., solid-state drives or magnetic disk drives) collectively configured to operate and store one or more databases for one or more customers 904. The database service 910 may also include one or more web servers configured to provide an API through which databases operated by the database service 910 are programmatically manageable. Customers 904 of the computing resource service provider 902 may operate and manage a database from the database service 910 by utilizing appropriately configured API calls. This, in turn, may allow a customer 904 to maintain and potentially scale the operations in the database.

The object-based data storage service 912 may include one or more computer system and one or more storage devices (e.g., solid-state drives or magnetic disk drives) collectively configured to store data for customers 904. The object-based data storage service 912 may also include one or more web servers configured to provide an API through which data storage services and data stored therein are programmatically manageable. The data stored in the data storage service 912 may be organized into data objects. The data objects may have arbitrary sizes except, perhaps, for certain constraints on size. Thus, the object-based data storage service 912 may store numerous data objects of varying sizes. The object-based data storage service 912 may operate as a key value store that associates data objects with identifiers of the data objects which may be used by the customer to retrieve or perform other operations in connection with the data objects stored by the object-based data storage service 912. Access to the object-based data storage service 912 may be through appropriately configured API calls.

The data storage archive service 914 may include one or more computer systems and archival storage devices (e.g., magnetic disk drives and/or magnetic tape drives) collectively configured to provide storage for data archiving and backup of customer data. The data storage archive service may also include one or more web servers configured to provide an API through which data storage services and data stored therein are programmatically manageable. The data storage archive service 914 may thus be configured to persistently store data that may be infrequently accessed and for which long retrieval times are acceptable to a customer 904 utilizing the service. A customer 904 may interact with the data storage archive service 914 to generate one or more archives. Each archive may represent one or more data files that may be combined to form the archive. A customer 904, through appropriately configured API calls to the service, may upload and retrieve archives from the data storage archive service 914 and monitor the retrieval of these archives, as each retrieval job may typically require several hours to complete.

The managed queuing service 916 may include one or more computer systems and queuing storage devices configured to enable customers 904 to store one or more messages in queues for use by one or more services provided by the computing resource service provider 902. Each message that is stored in a queue may comprise one or more appropriately configured API calls which, when processed by the recipient service, may cause the service to perform one or more actions. Alternatively, each message may comprise any variation of text, such as programming code, URLs for data objects and other statements.

The DNS service 918 may be designed to give customers a method to route end users to one or more communications network applications. For instance, the DNS service 918 may be configured to translate human-readable names, such as URLs, into numeric IP addresses that computer systems may use to connect to each other over the Internet. Thus, the DNS service 918 may be configured to connect requests to access one or more services provided by the computing resource service provider to the infrastructure that is operating within a data region. The DNS service 918 may additionally be configured to route customers of the computing resource service provider 902 to infrastructure outside of the data region, such as another computing system operated by a separate provider. The DNS service 918 may manage one or more DNS databases that may specify domain names assigned to computing resources within the data region and other data regions, as well as one or more domain name placeholders, which may include an alias that may be reserved for particular customers. The one or more domain name placeholders may include an alias that may be reserved for a particular customer, one or more control characters, a second-level domain name label and a top-level domain level. An example of a placeholder is "X/000.example.com", wherein "X" is the alias reserved for a particular customer, "/000" is the control character and "example.com" includes the second-level and top-level domain name labels. Additionally, for each domain name placeholder, the DNS databases may include an encrypted alias record. The alias record may be used to specify a customer identifier associated with the customer for whom the alias is reserved for.

The managed directory service 920 may provide a variety of services to enable computer systems and/or computer system client devices to access customer directories including, but not limited to, authentication, authorization and directory services. For example, the managed directory service 920 may provide authentication services which may authenticate credentials of a user, computer system, process, automated process or other such entity to at least determine whether that entity is authorized to access the managed directory service 920 and/or the customer directories associated with the managed directory service 920. In some embodiments, the credentials may be authenticated by the managed directory service 920 itself, or they may be authenticated by a process, program or service under the control of the managed directory service 920, or they may be authenticated by a process, program or service that the managed directory service 920 may communicate with or they may be authenticated by a combination of these and/or other such services or entities.

The managed directory service 920 may also provide authorization services which may authorize a user, computer system, process, automated process or other such entity to at least determine which actions of one or more possible actions that entity may perform. Examples of actions that an entity may or may not be authorized to perform include, but are not limited to, creating resources on the customer directory, destroying resources on the customer directory, attaching to resources on the customer directory, detaching from resources on the customer directory, providing access links to resources on the customer directory, reclaiming access links to resources on the customer directory, allowing reads from resources on the customer directory, allowing writes to resources on the customer directory and/or other such actions.

The managed directory service 920 may also provide directory services which may provide an authenticated entity access to the customer directories according to the authorization credentials and/or policies. For example, in an embodiment where a computer system entity may be authorized to read and write a certain data store on a customer directory, the ability to do so may be provided by the directory services. Directory services may provide access to customer directories by providing links to the customer directory locations such as by a URL or some other such linkage. As may be contemplated, the URL may be provided by the computer system client device, or by a process running at the data center, or by a process running on a computer system connected to the datacenter, or by the managed directory service or by a combination of these and/or other such computer system entities.

As noted above, a customer may utilize the managed directory service 920 to submit a request to assign a particular alias to the customer's directory. This alias may be utilized to create a domain name for the customer's directory that may be human-readable and usable to within one or more URLs for providing access to the customer's directory. The managed directory service 920 may be configured to communicate with the DNS service 918, such as through one or more API calls to the service, to determine whether the requested alias is available for the customer (e.g., has not been assigned to another customer and has not been reserved, through a placeholder, for another customer). If the alias is available, the managed directory service 920 may assign the alias to the particular customer directory and notify the DNS service 918 that the alias has been assigned to this customer. This may cause the DNS service 918 to update the DNS entry for the customer directory and update the DNS database to specify that the alias has now been assigned.

Figure 10:
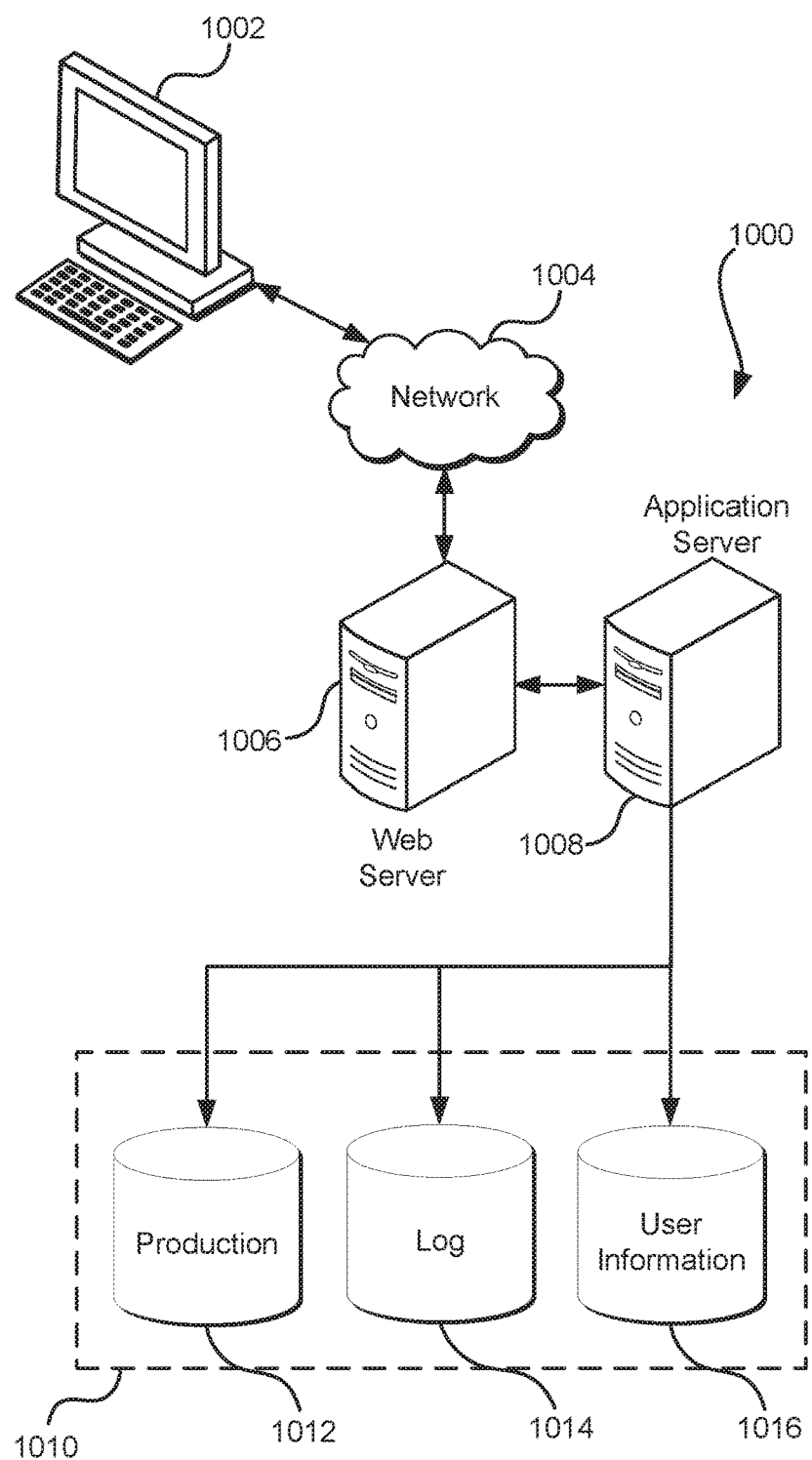
FIG. 10 shows an illustrative example of an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

The invention claimed is:

1. A computer-implemented method, comprising:
receiving, from a customer of a computing resource service provider, a request to assign an alias for a computing resource, the alias usable to determine a domain name for the computing resource;
determining that the alias has been previously reserved for the customer;
obtaining a domain name service record, the domain name service record specifying entities authorized to utilize the alias;
determining whether the customer corresponds to an entity specified in the domain name service record; and
on a condition that it is determined that the customer corresponds to an entity specified in the domain name service record, causing a domain name service to assign the alias to the computing resource.

2. The computer-implemented method of claim 1, wherein:
the domain name service record is encrypted; and
the method further comprises utilizing a cryptographic key to decrypt the domain name service record to determine whether the customer corresponds to an entity specified in the domain name service record.

3. The computer-implemented method of claim 1, wherein:
the domain name service record is obtained from a domain name service database cache; and
further comprising updating the domain name service database cache in response to the domain name service assigning the alias to the computing resource.

4. The computer-implemented method of claim 1, wherein the domain name service record corresponding to the alias is obtained from a domain name service in response to a domain name service query to the domain name service.

5. The computer-implemented method of claim 1, further comprising receiving a request from the customer to release the alias.

6. A system, comprising:
one or more processors; and
memory having stored thereon instructions that, as a result of being executed by the one or more processors, cause the system to:
prior to receipt of a request to cause a domain name service to perform an operation, store, with the domain name service, a record in association with a domain name, the record specifying entities authorized to cause a service to perform the operation, the operation being associated with assignment of the domain name;
receive, from an entity, the request to cause the domain name service to perform the operation;
determine, based at least in part on the record, whether the entity is authorized to cause the service to perform the operation; and
as a result of determining that the entity is authorized to cause the service to perform the operation, enable the entity to cause the service to perform the operation.

7. The system of claim 6, wherein:
the record is encrypted; and
the instructions further cause the system to utilize a cryptographic key to decrypt the record to determine whether the entity is authorized to cause the service to perform the operation.

8. The system of claim 6, wherein the record is stored in association with the domain name by an association with a domain name placeholder that is constructed based at least in part on the domain name and one or more control characters.

9. The system of claim 8, wherein the instructions further cause the system to utilize a string specifying the operation and the one or more control characters to identify the domain name placeholder and obtain the record to determine whether the entity is authorized to cause the service to perform the operation.

10. The system of claim 6, wherein the operation includes assigning the domain name to a computing resource in response to the request from the entity.

11. The system of claim 10, wherein the instructions further cause the system to specify, within a domain name system database, that the domain name has been assigned as a result of detecting that the entity has reserved the domain name.

12. The system of claim 6, wherein the entities authorized to cause the service to perform the operation are specified within the record as a result of computing resource usage by the entities satisfying a set of criteria.

13. The system of claim 6, wherein the instructions further cause the system to provide the record in association with the domain name to other services in response to a request from the other services to obtain the record.

14. A non-transitory computer-readable storage medium having collectively stored thereon executable instructions that, as a result of being executed by one or more processors of a computer system, cause the computer system to at least:
    reserve, prior to receipt of a request from an entity to cause the computer system to perform an operation, a domain name in association with the entity;
    in response to the receipt of the request, perform, to a domain name service, a query to obtain a record that specifies entities authorized to cause the computer system to perform the operation;
    determine, based at least in part on the record, whether the entity corresponds to the entities specified in the record; and
    as a result of determining that the entity is authorized to cause the computer system to perform the operation, cause the operation to be performed.

15. The non-transitory computer-readable storage medium of claim 14, wherein the record is stored, within the domain name service, in association with a domain name by an association with a domain name placeholder that is constructed based at least in part on the domain name and one or more control characters.

16. The non-transitory computer-readable storage medium of claim 15, wherein the instructions further comprise instructions that, as a result of being executed by the one or more processors, cause the computer system to utilize a string specifying the operation and the one or more control characters to perform the query to cause the domain name service to identify the domain name placeholder and provide the record.

17. The non-transitory computer-readable storage medium of claim 14, wherein the operation includes assigning the domain name to a computing resource in response to the request from the entity.

18. The non-transitory computer-readable storage medium of claim 17, wherein the record specifies that the domain name is available to the entity and that the entity is authorized to obtain the domain name.

19. The non-transitory computer-readable storage medium of claim 14, wherein:
    the record is encrypted; and
    the instructions further comprise instructions that, as a result of being executed by the one or more processors, cause the computer system to utilize a cryptographic key to decrypt the record to determine whether the entity is authorized to perform the operation.

20. The non-transitory computer-readable storage medium of claim 14, wherein the instructions further comprise instructions that, as a result of being executed by the one or more processors, cause the computer system to deny the request from the entity as a result of determining that the entity is not authorized to cause the computer system to perform the operation.

21. The non-transitory computer-readable storage medium of claim 14, wherein the domain name service provides an entry for the domain name to other services in response to a request from the other services to obtain the entry.

* * * * *